United States Patent [19]

Seyferth et al.

[11] Patent Number: 4,650,837
[45] Date of Patent: Mar. 17, 1987

[54] METHOD FOR CONVERTING SI-H CONTAINING POLYCARBOSILANES TO NEW AND USEFUL PRECERAMIC POLYMERS AND CERAMIC MATERIALS

[75] Inventors: Dietmar Seyferth, Lexington, Mass.; Yuan-Fu Yu, Dayton, Ohio

[73] Assignee: Massachusetts Institute of Technology, Cambridge, Mass.

[21] Appl. No.: 781,934

[22] Filed: Sep. 30, 1985

[51] Int. Cl.$^4$ .......................................... C08F 283/00
[52] U.S. Cl. ............................. 525/478; 423/449; 501/88; 525/474; 525/475; 528/25; 528/26; 528/28; 528/31; 528/32; 528/33; 528/37
[58] Field of Search .................... 423/449; 501/88; 525/474, 475, 478; 528/28, 25, 26, 31, 32, 33, 37

[56] References Cited

U.S. PATENT DOCUMENTS 4,395,460 7/1983 Gaul ..................................... 501/88
4,404,153 9/1983 Gaul, Jr. .............................. 501/88

OTHER PUBLICATIONS

R. W. Rice, Amer. Ceram. Soc. Bull., 62 889-892 (1983).
Kruger, C. R. & Rochow, E. G., J. Polymer Sci: Part A2:3179-3189 (1964).
Rochow, E. G., Monatshefte fur Chemie, 95:750-765 (1964).
Andrianov, K. A. et al., J. Organomet, Chem, 3:129 (1965).
Izv. Akad. Nauk SSSR, Otd. Khim. Nauk 290:1313 (1962).
Andrianov, K. A. et al., Dokl. Akad. Nauk SSSR, 145:1049 (1962).
Zhinkin, D. Ya et al., Plasticheskie Massy, 11:16 (1963).
Zoeckler, T. M. and Laine, R. M., J. Organ Chem. 48:2539-2543.
Redl G. and Rochow, E. G., Angewardte Chemie, 76:650 (1964).
S. Yajima, Amer. Ceram. Soc. Bull., 62:893-898,903 (1983).

Primary Examiner—Melvyn I. Marquis
Attorney, Agent, or Firm—George W. Neuner; Ronald I. Eisenstein

[57] ABSTRACT

A method of forming preceramic polymers using a polycarbosilane having repeat units of the formula $[RSi(H)-(CH_2)_q]$ (where R is H, a lower alkyl group having from 1 to about 6 carbon atoms, a cycloalkyl group having from 3 to about 6 carbon atoms, a substituted or unsubstituted lower aryl group having from 6 to about 10 carbons atoms, q is an integer 1 or greater), by reacting it with alkali metal silylamides in a weight ratio of polycarbosilane:silylamide of 10:1 or less is disclosed. Preferably, the alkali metal silylamide is a polymeric alkali metal silylamide of the formula $[(R^1SiHNH)_a(R^1SiN)_b(R^1SiHNM)_c]_m$ where $a+b+c=1$; $R^1$ is a lower alkyl group having from 1 to about 6 carbon atoms, a substituted or unsubstituted alkenyl group having from 2 to about 6 carbon atoms, a substituted or unsubstituted lower aryl group having from 6 to about 10 carbon atoms, a tri(lower)alkyl- or di(lower)alkylsilyl group or a di(lower)alkylamino group; M is an alkali metal or one-half equivalent of an alkaline earth metal; and n and m are integers greater than 1. Novel preceramic polymers formed by this method are also disclosed.

66 Claims, 5 Drawing Figures

METHOD FOR CONVERTING SI-H CONTAINING POLYCARBOSILANES TO NEW AND USEFUL PRECERAMIC POLYMERS AND CERAMIC MATERIALS

The Government has rights in this invention pursuant to Contract Number AFOSR 83-0003B awarded by the Department of the Air Force.

The present invention relates to a process for preparing organosilicon preceramic polymers useful for making silicon carbide, SiC, and silicon nitride/silicon carbide, $Si_3N_4/SiC$, ceramics and for their pyrolysis to ceramic materials.

There is a great deal of interest in preceramic polymer materials, which can be pyrolyzed to yield SiC, $Si_3N_4$ and other silicon-based ceramic materials. R. W. Rice, *Amer. Ceram. Soc. Bull.*, 62: 889-892 (1983). Applications for such polymers include, among others:

1. formation into complex shapes and subsequent pyrolysis to give a ceramic material of the same shape;
2. spinning into continuous fibers whose subsequent pyrolysis yields ceramic fibers;
3. as a matrix material for carbon or ceramic fibers, or as a binder for ceramic powders (with subsequent pyrolysis to form a ceramic body);
4. oxidation-resistant coatings on otherwise oxidizable materials (such as carbon/carbon composites)—after the polymer coating is made, it can be pyrolyzed to give the resistant ceramic coating;
5. infiltration of porous ceramic bodies such as ones obtained from reaction-sintered silicon nitride by the polymer itself (if liquid) or by a solution of the polymer, with subsequent pyrolysis to form a ceramic, resulting in better strength, oxidation resistance, etc., of the body; and
6. formation of thin films of the ceramic material for electronics applications.

S. Yajima, *Amer. Ceram. Soc. Bull.*, 62: 893-898; 903 (1983) discloses using $(CH_3)_2SiCl_2$ as a starting material for a preceramic polymer for the preparation of SiC-containing ceramics. The polymer of Yajima is prepared by sodium metal condensation of $(CH_3)_2SiCl_2$ to result in a polysilane, $—[(CH_3)_2Si]_n—$ (n is approximately 30). This polysilane can then form either a "Mark I" polymer or a "Mark III" polymer depending upon the treatment used. Heating in an autoclave under argon at 100 kPa at 450°-470° C. for 14 hours results in a Mark I polymer while adding a few percent of a polyborodiphenylsiloxane and heating under nitrogen at ambient pressure at 350° C. for 10 hours results in the Mark III polymer. In either case, the poly-silicon backbone is converted to a polymeric chain in which the main repeat unit is:

(I)

The Mark I polymer also contains some $—[(CH_3)_2SiCH_2]—$ units. The Mark III polymer contains some Si-Si bonds in the form $—[(CH_3)_2Si—Si(CH_3)_2]_n((n=2-8)$ units and a low percentage of $[(C_6H_5)_2SiO]$ units. These preceramic polymers can be processed to give ceramic fibers containing SiC, some free carbon and some $SiO_2$. However, there are problems associated with these polycarbosilane-derived ceramics. They have a tendency to crystallize below 1200° C., they have a $SiO_2$ content as a result of an oxidative cure step, and free carbon and a relatively low ceramic yield is obtained upon their pyrolysis for a commercial product. While the ceramic yield for the Mark III polymer is 68%, the yield for the Mark I polymer is only 54%.

It would be useful to have a polymer precursor that is formed from readily available and relatively cheap starting materials, that is stable at room temperature, is soluble in organic solvents and whose pyrolysis can typically provide a significantly higher yield of ceramics which contain SiC or SiC and $Si_3N_4$ than the polymers of Yajima.

SUMMARY OF THE INVENTION

It has now been found that reacting a polycarbosilane polymer containing repeat units of the formula $[RSi(H)—(CH_2)_q]$, i.e., (II)

(where q is an integer 1 or greater, R is H, a lower alkyl group having from 1 to about 6 carbon atoms, a cycloalkyl group having from 3 to about 6 carbon atoms, or a substituted or unsubstituted lower aryl group having from 6 to about 10 carbon atoms), with an alkali metal silylamide in a ratio of poylycarbosilane: alkali metal silylamide of about 10 or less, converts these polycarbosilane compounds into materials which upon pyrolysis typically have ceramic yield significantly better than the original polycarbosilane compound. Preferably, the alkali metal amide is a polymeric alkali metal silylamide of the formula $[(R^1SiHNH)_a(R^1SiN)_b(R^1SiHNM)_c]_m$ (where $a+b+c=1$; $R^1$ is a lower alkyl group having from 1 to about 6 carbon atoms, a substituted or unsubstituted lower alkenyl group having from 2 to about 6 carbon atoms, a substituted or unsubstituted lower aryl group having from 6 to about 10 carbon atoms, a tri(-lower)alkyl- or di(lower)alkylsilyl group or a di(lower)alkylamino group; M is an alkali metal or one-half equivalent of an alkaline earth metal; and m is an integer greater than 1). This alkali metal silylamide may be preformed and added to the polycarbosilane containing repeat units of the formula II. Alternatively, one may prepare the alkali metal silylamide in situ, in the presence of the polycarbosilane containing repeat units of the formula II.

Aryl-substituted polymers of the type $[RSi(H)—(CH_2)_q]$ (e.g., where R is phenyl), react in the same way as the above described polycarbosilanes to give new polycarbosilane/organopolysilazane hybrid polymers.

In one embodiment of the present invention, the polymeric alkali metal silylamide is generated by treating the ammonolysis product of $R^1SiHX_2$ ($R^1$ is as defined above and X is a halogen) with a basic catalyst capable of deprotonating the hydrogen from a nitrogen atom adjacent to a silicon atom. The silylamide thus formed can react with the $[RSi(H)—(CH_2)_q]$ already present. With either the preformed polysilylamide or the in situ silylamide procedure, the reaction mixture containing the polycarbosilane and the polysilylamide is stirred at room temperature and preferably heated at reflux in a suitable solvent such as tetrahydrofuran to complete the reaction. The resulting solution is then cooled and quenched with an organic halide or a silicon halide to produce the organosilicon polymers of the present invention. The polymers formed by either method can then be pyrolyzed to yield ceramic materials in high yield.

DETAILED DESCRIPTION OF THE INVENTION

We have now discovered that the reaction of polymers containing a multiplicity of repeat units of the formula $[RSi(H)—(CH_2)_q]$ (where q is an integer 1 or greater, R is H, a lower alkyl group having from 1 to about 6 carbon atoms, a cycloalkyl group having 3 to about 6 carbon atoms, and a substituted or unsubstituted lower aryl group having 6 to about 10 carbon atoms), (hereinafter polymers containing such repeat units are referred to as "polycarbosilanes"), with an alkali metal silylamide results in a novel preceramic polymer. Typically, the pyrolysis of this new polymer gives a black ceramic solid in a yield that is about 10% to 50% greater than the parent polycarbosilane.

The polycarbosilane polymer should contain at least 25 mole % of repeat units of the formula II, i.e. $[RSi(H)—(CH_2)_q]$, in addition to other repeat units, such as $[R_2Si(CH_2)_q]$ (e.g. the Yajima polymers). Preferably the polycarbosilane polymer contains at least 35 mole % of repeat units of formula II. More preferably, the polymer contains at least 50 mole % repeat units of formula II.

The polymer may also contain a mixture of repeat units of the above described formula, e.g., both $[RSi(H)—(CH_2)_q]$ and $[R'Si(H)—(CH_2)_{q'}]$ (R' and q' are defined the same as R and q, respectively, but R' may be different than R and q' may be different than q). R is preferably a lower alkyl group, more preferably R is $CH_3$. Preferably q is equal to 1-3, more preferably it is equal to one.

The polycarbosilane and alkali metal silylamide are typically added in a weight ratio of polycarbosilane:alkali metal silylamide of about 10:1 or less. Preferably this ratio is about 5:1 or less. More preferably the ratio is about 3:1 or less. Most preferably the ratio is about 1:1.

Common alkali metal silylamides that can be used in the practice of the present invention include: $[R^2R^3R^4Si]_2NM$ wherein $R^2$, $R^3$ and $R^4$ are each a lower alkyl group having from 1 to about 6 carbon atoms, a lower alkoxy group having from 1 to about 6 carbon atoms, a substituted or unsubstituted vinyl group, a substituted or unsubstituted allyl group, a substituted or unsubstituted lower aryl group having from 6 to about 10 carbon atoms, a tri(lower)alkyl- or di(lower)alkylsilyl group or a di(lower)alkylamino group, $R^2$, $R^3$ and $R^4$ may be the same or different; and M is an alkali metal or one-half equivalent of an alkaline earth metal. Common alkali metal silylamides include: $[(CH_3)_3Si]_2NK$, $[(CH_3)_2(CH_2=CH)Si]_2NK$. The alkali metal silylamide can also be partially deprotonated cyclo-$[R^5R^6SiNH]_m$ containing cyclo-$[R^5R^6SiNM]$ units wherein $R^5$ and $R^6$ are each a lower alkyl group having from 1 to about 6 carbon atoms, a lower alkoxy group having from 1 to about 6 carbon atoms, a substituted or unsubstituted vinyl group, a substituted or unsubstituted allyl group, a substituted or unsubstituted lower aryl group having from 6 to about 10 carbon atoms, a tri(lower)alkyl- or di(lower)alkylsilyl group or a di(lower)alkylamino group, $R^5$ and $R^6$ may be the same or different; M is as defined above and m is an integer greater than 1. For example, the reaction products of one molar equivalent of KH with one of cyclo-$[(CH_3)_2SiNH]_3$ or of one molar equivalent of KH with one of cyclo-$[(CH_3)(CH_2=CH)SiNH]_3$, and the like. The person skilled in the art can select other alkali metal silylamides to use, including the lithium, sodium, rubidium and cesium derivatives. Treatment of the polycarbosilane with the alkali metal silylamides generally increases the ceramic yield in the pyrolysis of the resulting polycarbosilane.

Preferably one uses a polymeric silylamide of the formula $[R^1SiHNH)_a(R^1SiN)_b(R^1SiHNM)_c]_m$, where $a+b+c=1$; $R^1$ is a lower alkyl group having from 1 to 6 carbon atoms, a substituted or unsubstituted alkenyl group having from 2 to about 6 carbon atoms, a substituted or unsubstituted lower aryl group having from 6 to about 10 carbon atoms, a tri(lower)alkylsilyl or di(lower)alkylsilyl or di(lower)alkylamino group; M is an alkali metal or one-half equivalent of an alkaline earth metal; and m is an integer greater than 1. In the practice of the present invention, $R^1$ preferably is a lower alkyl group, more preferably $CH_3$. These polysilylamide compounds have been described in U.S. Pat. No. 4,482 669, issued Nov. 13, 1984, which is incorporated herein by reference. The above-named patent describes the formation of novel preceramic polysilazanes by treatment of the mainly cyclic ammonolysis product of, for example, $CH_3SiH(Cl_2)$ with catalytic quantities of a base, for example, KH, in organic solvents, for example, tetrahydrofuran, THF. After these $CH_3SiHCl_2$ derived compounds are treated with an electrophile such as methyl iodide, $CH_3I$, polymers having the $[(CH_3SiHNH)_a(CH_3Si)_b(CH_3SiHNCH_3)_c]_m$ are obtained. Prior to the addition of $CH_3I$, a reactive "living" polymer intermediate, an alkali metal silylamide of the type $[(CH_3SiHNH)_a(CH_3SiN)_b(CH_3SiHNM)_c]_m$ is obtained. This intermediate species can react with electrophiles other than $CH_3I$, e.g., with diverse chlorosilanes, etc. Pyrolysis of such $CH_3I$-treated polysilazanes typically yields a ceramic material containing SiC, $Si_3N_4$ and "free" carbon.

In one embodiment of the present invention, the use of the polymeric alkali metal silylamide of the formula $[(R^1SiHNH)_a(R^1SiN)_b(R^1SiHNM)_c]_m$ improves the ceramic yield of the polycarbosilanes. When this alkali metal silylamide, $[(R^1SiHNH)_a(R^1SiN)_b(R^1SiHNM)_c]_m$ (where m is an integer greater than 1), is reacted with a polycarbosilane having repeat units of the formula $[RSi(H)—(CH_2)_q]$, the reaction product after treatment with a suitable electrophile such as an organic or a silyl halide, incorporates both starting materials. When this reaction product is pyrolyzed, the ceramic yield is significantly greater than that of the "parent" polycarbosilane polymer. Weight ratios of polycarbosilane:polymeric alkali metal silylamide from about 10 to about 1, and preferably from 5:1 to 1:1 typically provide useful results. However, other ratios can be used depending on the particular starting materials and their pyrolysis characteristics.

The organosilicon polymers thus formed by reaction of repeat units of [RSi(H)—(CH$_2$)$_q$] and [(R$^1$SiHNH)$_a$(R$^1$SiN)$_b$(R$^1$SiHNM)$_c$]$_m$, followed by treatment with an electrophile, henceforth will be referred to as "graft" polymers.

Additionally, use of the reaction product of these two compounds results in a product that is self-curing as the temperature is raised in the production of ceramic material. This again is an improvement over pyrolysis of the polycarbosilane polymer alone. Consequently, it is possible to avoid the detrimental SiO$_2$ that forms when the oxidative cure step is used with the polycarbosilane polymer per se.

Polycarbosilanes containing mixed repeat units, i.e. [RSi(H)—(CH$_2$)$_q$] and [R'Si(H)—(CH$_2$)$_{q'}$] can be used. In this system, R preferably is a lower alkyl, more preferably, R is CH$_3$. R' is defined as was R (above), but it need not be the same as R. Further, these aforesaid mixtures of compounds can be used to obtain further flexibility in tailoring the properties of the aforesaid product. Also included in this invention is the case of aromatic repeat units of [RSi(H)—(CH$_2$)$_q$], for example, where R is a phenyl or substituted phenyl group, as R can be a lower aryl group. Thus the polycarbosilane may contain linear or cyclic species, or a hybrid of both types.

Mixtures of alkali metal silylamides, i.e., [(R$^1$SiHNH)$_a$(R$^1$SiN)$_b$(R$^1$SiHNE)$_c$]$_m$ and [(R$^1$'SiHNH)$_{a'}$(R$^1$'SiN)$_{b'}$(R$^1$'SiHNE)$_{c'}$]$_{m'}$ (where E is the moiety introduced by reaction with an electrophile, e.g., a lower alkyl group of 1 to 6 carbon atoms, preferably CH$_3$, or a silyl group), also may be used.

The preceramic product obtained by using alkali metal silylamides, even in only small amounts, differs from the starting polycarbosilane.

The "graft" polymer is formed by combining the already formed polymeric alkali metal silylamide with the polycarbosilane in varying proportions in an organic solvent. Thereafter, the mixture is stirred at room temperature for sufficient time for the two compounds to react. Any organic solvent in which both polymer systems are soluble without reaction can be used. Such organic solvents include, for example, THF, diethyl ether, glycol ethers, alkanes, arenes and combinations thereof. The solution of the mixture may be heated above room temperature, and can be refluxed to speed up the completion of the reaction. After refluxing, the mixture is quenched with an electrophile, E-X, to form the organosilicon "graft" polymer. The electrophile can be an alkyl halide, sulfate, or sulfonate; a halosilane; or the like. Typically, CH$_3$I or a chlorosilane is used, although other equivalent electrophiles well-known to those skilled in the art can also be used. E is preferably a lower alkyl group or silyl group; X is preferably a halide, sulfate or sulfonate. The organosilicon polymers formed by the present ("graft") process typically give ceramic yields 10% to 50% greater (based on weight of the starting materials) than the polycarbosilane. (See Table 1) and have a variable molecular weight.

Figure 1:
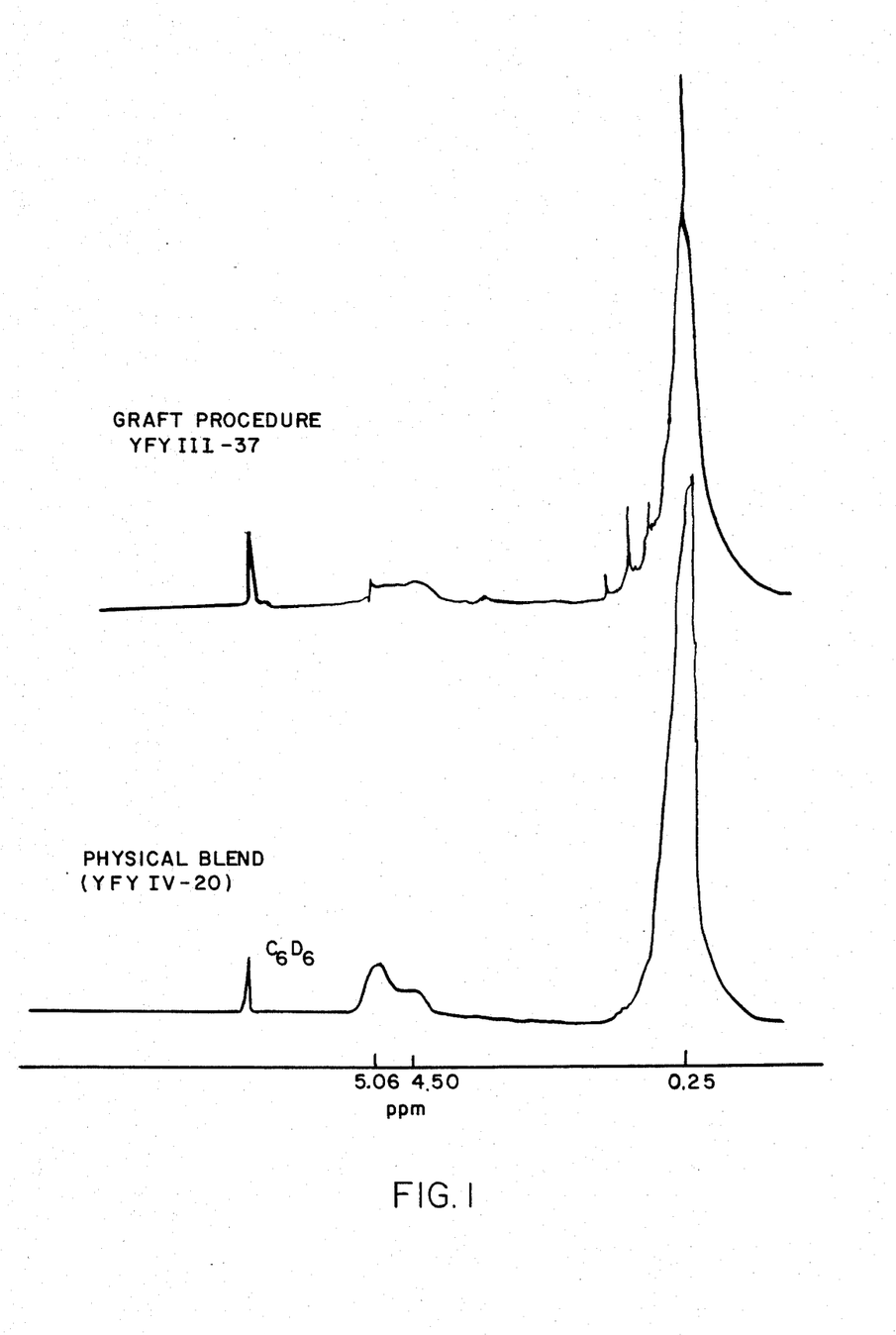
FIG. 1 is a proton NMR spectrum comparing a polymer formed by adding already preformed polysilylamide (III-37) with a 1:1 by weight physical mixture of polycarbosilane and preformed, polysilylamide.

FIG. 1 is a proton NMR spectrum comparing a 1:1 by weight physical mixture of the polycarbosilane and the polysilazane and a "graft" polymer formed by reacting the polycarbosilane with a preformed silyamide. The NMR spectrum shows that a new polymer is obtained when the polycarbosilane and the silylamide are heated together in solution and then quenched with methyl iodide. First, the CH$_3$Si/HSi integrated ratio differ, 9.4 in the former, 8.7 in the latter. Secondly, the CH$_3$SiHNH proton (at $\delta$5.06) to CH$_3$SiH (at $\delta$4.50) proton ratio has changed from about 2 in the physical mixture to about 1 in the reaction mixture.

These preceramic organosilicon polymers can then by pyrolyzed under nitrogen or an inert atmosphere to result in ceramic materials in high yield. Typically, pyrolysis under nitrogen gives ceramic products in a yield of 64–88%.

What is referred to herein as an "in situ" polymer is obtained by carrying out the cyclo-(R$^1$SiHNH)$_n$/MH reaction in solution in the presence of the polycarbosilane. In this method, the polycarbosilane is added to an organic solvent. Afterwards, the cyclo-(R$^1$SiHNH)$_n$ mixture (generated by reacting in solution anhydrous ammonia with R$^1$SiHX$_2$, where R$^1$ is the same as defined earlier and X is a halogen) is added. One then adds to the solution a basic catalyst capable of deprotonating the hydrogen from a nitrogen atom adjacent to a silicon atom. See U.S. Pat. No. 4,482,669. The reaction mixture gradually changes color and hydrogen is evolved. The resulting solution is then stirred at room temperature for sufficient time for the silylamide intermediates and the polycarbosilane to react. This solution can be heated above room temperature, and can be heated at reflux to complete the reaction. Afterwards, the reaction mixture is allowed to cool to room temperature, if required, and quenched with an electrophile such as CH$_3$I or a halosilane, such as a chlorosilane, to produce the organosilicon "in situ" polymer. The molecular weight of the "in situ" polymer is variable. On pyrolysis this material provides a yield of a black ceramic material, that is typically 10% to 50% greater than that obtained on pyrolysis of the polycarbosilane (see Table 1).

TABLE 1

| TGA Ceramic Yield of Preceramic Polymer | |
|---|---|
| Wt ratio of Polycarbosilane: Alkali Metal Silylamide | Ceramic Compound Yield (Example) |
| 100:0 | 58% (A) |
| 1:1 | 84% III-37(B.1.(a)) |
| 5:1 | 67% III-57(B.1.(b)) |
| 1:1 | 88% III-39(B.2.(a)) |
| 5:1 | 64% III-59(B.2.(b)) |
| 1:1 | 86% III-38(C.1.(a)) |
| 5:1 | 80% III-56(C.1.(b)) |
| 1:1 | 86% III-40(C.2.(a)) |
| 5:1 | 66% III-58(C.2.(b)) |

The organosilicon polymer formed by either of the above "graft" or "in situ" methods usually is separated from solution. The solvent is removed by using techniques well known to a person of ordinary skill in the art. One standard method is distillation, preferably trap-to-trap distillation. The polymer, typically a white powder that is soluble in an organic solvent, is thereby obtained. One may also combine trap-to-trap distillation with centrifuging, followed by trap-to-trap distillation to separate the polymer from solution.

The "in situ" preceramic polymer differs physically from the "graft" preceramic polymer. Major differences are observed in the form of their thermogravimetric analysis (TGA) curves. Both types of polymers are useful as preceramic materials.

Although not wishing to be bound by theory, it appears likely that in the "in situ" preparation, intermediates formed, for example, by the action of KH on $(CH_3SiHNH)_n$ cyclics also react with the polycarbosilane before the polymeric alkali metal silylamide which is the starting reactant in the "graft" procedure has a chance to be formed to its usual extent. This results in either less of the original $CH_3SiHNH$ protons being lost and/or more of the polycarbosilane $[RSi(H)—(CH_2)_q]$ units being reacted.

The repeat units of $[RSi(H)—(CH_2)_q]$ polycarbosilanes can also be converted to new organosilicon polymer systems which are useful preceramic materials by reacting them with polymers which are obtained by either partial or complete ring opening of diorganocyclopolysilazanes, $[R^1R^{11}SiNH]_m$ ($R^{11}$ is defined as $R^1$, and may be the same or different) which have been partially deprotonated by treatment with a base. $R^{11}$ is preferably the same as $R^1$. $R^1$ and $R^{11}$ are preferably lower alkyl groups, more preferably $CH_3$. Such polymers may be prepared by heating such cyclopolysilazanes in the presence of an ammonium halide, preferably $NH_4Br$, at 160° C. and treating the product with ammonia, as described by Krüger, C. R. and Rochow, E. G., *J. Polymer Sci.: Part A* 2:3179–3189 (1964) and Rochow, E. G., *Monashefte fur Chemie*, 95:750–765 (1964). The polymers thus prepared are gums or waxes, can have molecular weights greater than 10,000 and are believed to be composed of cyclopolysilazane units linked together by linear $[R^1R^{11}SiNH]_x$ units. Related polymers can also be prepared by heating cyclic $[CH_3R^7SiNH]_m$ ($R^7$=$CH_3$ or $C_6H_5$) with about 1% KOH at 200°–400° C. (Andrianov, K. A. et al., *J. Organomet. Chem.*, 3:129 (1965); *Izv. Akad. Nauk SSSR. Otd. Khim. Nauk* 290:1313 (1962)) or with electrophilic agents such as $AlCl_3$, $TiCl_4$, $SnCl_4$ or $H_2SO_4$ (Andrianov, K. A. et al., *Dokl. Akad. Nauk SSSR*, 145:1049 (1962); *Plasticheskie Massy*, 11:16 (1963), *Izv. Akad. Nauk SSSR*, 549 (1962)). Essentially linear $[R^1R^{11}{}_2SiNH]_x$ oligomers can be prepared by transition metal-catalyzed ring opening of cyclo-$[R^1R^{11}SiNH]_m$ as described by Zoeckler, T. M. and Laine, R. M., *J. Organ. Chem.*, 48:2539–2543, or by heating a cyclotrisilazane under 10 atm. of ammonia at 140° C., as described by Redl, G. and Rochow, E. G., *Angewandte Chemie*, 76:650 (1964) Polymers of these types may be treated with small amounts (a few mole percent based on available NH groups) of a base (such as KH) to give new types of polymeric silylamides, i.e , polysilazanes containing a few mole percent of $R^1R^{11}SiNM$ units (M is as defined earlier). These can react with the polycarbosilanes containing repeat units of $[RSi(H)—(CH_2)_q]$ to give new hybrid organosilicon polymers with properties which make them useful precursors for $SiC/Si_3N_4$ ceramic materials.

For example, cyclo-$[(CH_3)_2SiNH]_m$ was heated at 160° C. in the presence of $NH_4Br$, and the product was treated with gaseous $NH_3$ in diethyl ether. Volatiles were stripped off in vacuo and the polymer which remained was treated with 5% KH in THF solution at reflux. The polycarbosilane, was added and after 4 hours at reflux methyl iodide was added. A solid organosilicon polymeric product which was soluble in organic solvents was obtained. Pyrolysis to 1000° C. converted it to a black ceramic material.

The excess of free carbon, which can be a problem with the starting polycarbosilanes, can be dealt with by using a ternary system of: (1) the polycarbosilane; (2) the polysilazane (as the polymeric silylamide, either preformed or generated in situ) and (3) a polysilane whose pyrolysis alone gives a ceramic product which contains an excess of silicon. Examples of such polysilanes are those which are produced by the sodium condensation of methyldichlorosilane (See U.S. patent application Ser. No. 756,353, which is incorporated herein by reference). These polysilanes are refereed to as organopolysilanes and have the formula $[R^aSiH]_x$-$(R^aSi)y]_n$ (where $x+y=1$, n is an integer greater than 1, $R^a$ is lower alkyl group having from about 1 to about 6 carbon atoms, a cycloalkyl group having from 3 to about 6 carbon atoms, a substituted or unsubstituted lower aryl group having from 6 to about 10 carbon atoms, or a tri(lower)alkyl- or di(lower)alkylsilyl group). Preferably $R^a$ is a lower alkyl group, more preferably $R^a$ is $CH_3$. Using an appropriate mixture of the three polymers (which can be calculated from the results of the analyses of the ceramic products of the pyrolysis of each individual polymer, e.g., the $CH_3I$-quenched polymer in the case of the polymeric silylamide), one can obtain a ceramic product which contains a minimal excess of either element, carbon or silicon. Such hybrid ternary preceramic polymers are soluble in organic solvents and, depending on component ratios used, are of variable molecular weight. Their pyrolysis gives black ceramic products in high (generally>80%) yield.

Physical blends of polymers containing repeat units of $[RSi(H)—(CH_2)_q]$, for example, the Yajima polycarbosilane, with the "quenched" $[(R^1SiHNH)_a(R^1SiN)_b(R^1SiHNE)_c]_m$ organosilazane polymer of U.S. Pat. No. 4,482,669 can be used since these react when they are heated together. When approximately equal molar quantities of the polymers where R=$CH_3$, $R^1$=$CH_3$, q=1 and E=$CH_3$, were mixed and finely ground together and then subjected to pyrolysis to 1000° C., a ceramic yield was obtained which was significantly higher than that which resulted when the polycarbosilane was pyrolyzed separately. (See Table 2).

When such mixtures were heated, in the absence of a solvent at 200° C. under nitrogen, white foamy solids were obtained which were insoluble in nonpolar organic solvents, thus demonstrating that a reaction had occurred below 200° C. and prior to pyrolysis.

Ternary blends of the polycarbosilane, the $[(CH_3SiH)_x(CH_3Si)_y]_n$ liquid polysilazane and the $[(CH_3SiHNH)_a(CH_3SiN)_b(CH_3SiHNCH_3)_c]_m$ polysilazane behaved similarly. An obvious reaction occured when such a mixture had been heated to 200° C., since the originally soluble mixture became insoluble in organic solvents.

The combined polymers obtained by the "graft," "in situ" and physical blend methods can be converted to black ceramic fibers. Pyrolysis of pressed bars of the combined polymers to 1000° C. provides a black solid product. In other experiments, silicon carbide powder was dispersed in toluene solutions of the preceramic polymers of the present invention. The solvent was evaporated and the residue, a fine powder of silicon carbide with combined polymer binder, was pressed into bars and pyrolyzed at 1000° C. A ceramic bar was obtained showing a low weight loss and slightly shrunken size.

The invention will be further illustrated by the examples that follow:

A. General

All glassware was flame-dried under vacuum or under a stream of nitrogen prior to use. Tetrahydrofuran (THF) and benzene were distilled from sodium and benzophenone ketyl. Hexane was distilled from LiAlH$_4$. Solvents were deoxygenated by bubbling nitrogen through them prior to use. Methyldichlorosilane, CH$_3$SiHCl$_2$, and dimethyldichlorosilane, (CH$_3$)$_2$SiCl$_2$, were commercial products The polycarbosilane was purchased from Dow Corning Corporation. Its characterization is reported below. The ammonolysis of CH$_3$SiHCl$_2$ in ether and in THF solution has been described in U.S. Pat. No. 4,482,699 (D. Seyferth and G. H. Wiseman), as has the reaction of ammonolysis products, [CH$_3$SiHNH]$_m$, with KH to give the polymeric silylamide, [(CH$_3$SiHNH)$_a$(CH$_3$SiN)$_b$(CH$_3$SiHNK)$_c$)]$_m$. The ammonolysis of (CH$_3$)$_2$SiCl$_2$ is a long-known reaction and is described in U.S. patent application Ser. No. 756,353, which is incorporated herein by reference. Similarly, the sodium condensation of CH$_3$SiHCl$_2$ to give [(CH$_3$SiH)$_x$(CH$_3$Si)$_y$]$_n$ polysilanes has also been described in the above-named patent application.

$^1$H NMR spectra were recorded on a JEOL-FX-90Q spectrometer operating at 90 MHz. Elemental analyses were performed by Galbraith Laboratories, Knoxville, Tennessee. Molecular weights were determined by measuring the freezing point depression of a weighed sample of benzene caused by a weighed sample of product. Thermal analyses were performed using a Perkin-Elmer TGS-2 Thermogravimetric Analyzer interfaced with a System 7/4 Thermal Analysis Controller. Samples were heated, under argon, from 25°–1000° C. at a rate of 10° C./min. Large scale pyrolyses were carried out in fused silica boats using a Lindberg 59344 tube furnace (25°–1000° C., 10° C./min) under argon atmosphere. Scanning electron micrographs were obtained using an AMR instrument, operating at 20 KV.

Characterization of the Polycarbosilane.

The polycarbosilane, a white solid, was purchased from Dow Corning Corporation. The following data were collected on it:

$^1$H NMR (90 MHz, C$_6$D$_6$): δ4.52 (broad, SiH, 1H) 0.26 (broad, SiCH$_3$ and SiCH$_2$Si, 8.6H)

IR (KBr, Nujol, cm$^{-1}$): 2104(s), 1253(s), 1014(s, broad), 845(s, broad), 734(s).

Molecular Weight (cryoscopic in benzene): 1210 g/mol TGA (25°–1000° C., 10° C./min): 58% yield of a black ceramic solid

T$_{1/2}$=510° C.

B. Reactions of [(CH$_3$SiHNH)$_a$(CH$_3$SiN)$_b$(CH$_3$SiHNK)$_c$]$_m$ Living Polymer with Polycarbosilane ("Graft Procedure").

1. Using Cyclo-(CH$_3$SiHNH)$_m$ Prepared in Diethyl Ether.

a. Polycarbosilane/[CH$_3$SiHNH]$_m$ in 1:1 weight ratio (III-37).

In a dry box, a 250 ml round bottomed flask equiped with a stir-bar, reflux condenser and a serum cap was charged with 0.15 g (3.75 mmol) of KH (4.4 mol %, based on (CH$_3$SiHNH)). THF (50 ml) was added to suspend the KH. (CH$_3$SiHNH)$_m$ (5 g, 0.085 mol, in 80 ml of THF), prepared by CH$_3$SiHCl$_2$ ammonolysis in ether solution, was added into the flask by syringe. A vigorous reaction occurred and a large amount of H$_2$ gas was evolved which was vented out of the flask through an oil bubbler. After the addition was finished, the reaction mixture was stirred at room temperature for 2 hours.

Figure 2:
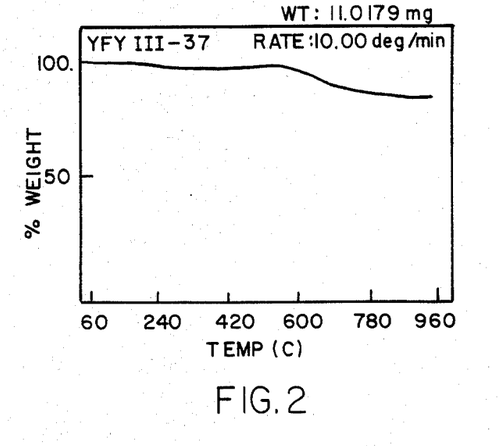
FIG. 2 is a thermogravimetric analysis (TGA) curve of polymer III-37.

A separate 250 ml round-bottomed flask equipped with a septum, reflux condenser and stir-bar was charged with 5.0 g of polycarbosilane. THF (50 ml) was added by syringe to give a clear solution. The living polymer solution previously described was cannulated slowly into the reaction flask. The resulting clear solution was stirred at room temperature for two hours and then heated at reflux for 24 hours. The reaction mixture was allowed to cool to room temperature and 0.5 ml (7.9 mmol) of CH$_3$I was added, the mixture was refluxed for 2 hours and the solvent was removed by trap-to-trap distillation. The product was extracted with 200 ml of hexane and the insoluble residue removed by centrifugation. The hexane was removed from the supernatant solution by trap-to-trap distillation, leaving 9.6 g (96% yield by weight) of a white solid. The TGA curve of the mixed polymer is shown in FIG. 2. The polymer is very soluble in hexane, benzene, and THF.

$^1$H NMR (90 MHz, C$_6$D$_6$): δ5.02, 4.55 (broad, SiH, 1H) 1.56, 1.23, 0.88 (SiCH$_3$NH) 0.25, 0.18 (broad, SiCH$_3$, SiCH$_2$ 9.4H, for the total area of SiCH$_3$ SiCH$_2$ and SiCH$_3$NH).

Molecular weight (cryoscopic in benzene): 1550 g/mol TGA (25°–1000° C., 10° C./min): 84% yield of a black ceramic solid T$_{1/2}$=640° C. (T$_{1/2}$=temperature at which one-half of weight loss has occurred.)

Melting point (sealed capillary under vacuum): Does not melt at temperatures up to 320° C.

Analysis: Found: C, 32.00; H, 7.47; Si, 48.25; N, 11.87; Total: 99.59%.

Ceramic Analysis: Large scale pyrolysis of the sample under N$_2$ to give 77% yield of a black ceramic solid (25°–1000° C., 10° /C./min).

Found: C, 25.54; H, 0.62; Si, 53.04; N, 15.55; Total: 94.75%. Composition: 1SiC+0.2Si$_3$N$_4$+0.7 C. (equivalent to 10.5 weight % of free carbon)

b. Polycarbosilane/[CH$_3$SiHNH]$_n$ in 5:1 Weight Ratio (III-57).

According to the procedure described previously, the reaction between 0.05 g (1.25 mmol) KH and 1.0 g (0.017 mol) (CH$_3$SiHNH)$_m$ (prepared in ether solution) in 100 ml of THF was carried out under nitrogen. The living polymer solution then was added to the THF (50 ml) solution of the polycarbosilane (5.0 g). The resulting solution was stirred at room temperature for 16 hours. To the reaction mixture 0.5 ml (7.9 mmol) of CH$_3$I was added and the mixture was refluxed for 2 hours. Workup as described in the previous experiment left 5.8 g (97% yield by weight) of a white solid. The polymer is very soluble in hexane, benzene, and THF.

$^1$H NMR (90 MHz, C$_6$D$_6$: δ5.00, 4.55 (broad, SiH, 1H) 1.22, 0.88 (SiCH$_3$NH) 0.30 (broad, SiCH$_3$ and SiCH$_2$ 9H, for the total area of SiCH$_3$, SiCH$_2$ and SiCH$_3$NH)

Molecular weight (cryoscopic in benzene): 1100 g/mol TGA (25°–1000° C., 10° C./min): 67% yield of a black ceramic solid

T$_{1/2}$=520° C.

Melting point (sealed capillary under vacuum): Softens at 220° C., melts at 240° C. (to a thick gum), no further change up to 300° C.

2. Using Cyclo-$(CH_3SiHNH)_m$ Prepared in THF.

a. Polycarbosilane/$[CH_3SiHNH]_m$ in 1:1 weight ratio (III-39).

In a dry box, a 250 ml round-bottomed flask equipped with a stir-bar, reflux condenser and a serum cap was charged with 0.15 g (3.75 mmol) of KH (4.4 mol %, based on ($CH_3SiHNH$)). THF (50 ml) was added to suspend the KH ($CH_3SiHNH)_m$ (5.0 g, 0.085 mol, in 80 ml of THF), prepared by ammonolysis of $CH_3SiHCl_2$ in THF solution, was added into the flask by syringe. A vigorous reaction occurred and a large amount of $H_2$ gas was evolved which was vented out of the flask through an oil bubbler. After the addition was finished, the reaction mixture was stirred at room temperature for 2 hours.

Figure 3:
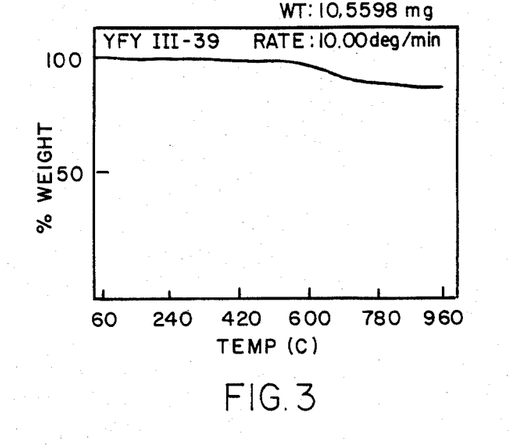
FIG. 3 is a TGA curve of a polymer formed by adding already preformed polysilylamide (III-39).

A separate 250 ml round-bottomed flask equipped with a septum, reflux condenser and stir-bar was charged with 5.0 g of polycarbosilane. THF (50 ml) was added by syringe to give a clear solution. The living polymer solution previously described was cannulated slowly into the reaction flask. The resulting solution was stirred at room temperature for two hours and then heated at reflux for 24 hours. The reaction mixture was allowed to cool to room temperature and 0.5 ml (7.9 mmol) of $CH_3I$ was added, the mixture was heated a few hours, and the solvent was removed by trap-to-trap distillation. The product was extracted with 200 ml of hexane and the insoluble residue removed by centrifugation. The hexane was removed from the supernatant solution by trap-to-trap distillation, leaving 9.7 g (97% yield by weight) of a white solid. The TGA curve of the mixed polymer is shown in FIG. 3. The polymer is very soluble in hexane, benzene and THF.

$^1$H NMR (90 MHz, $C_6D_6$) δ5.33, 4.58 (broad, Si$\underline{H}$, 1H) 1.37, 1.25, 0.91 (SiC$\underline{H_3}$N$\underline{H}$) 0.29, 0.22 (broad, SiC$\underline{H_3}$, SiC$\underline{H_2}$, 9.9H, for the total area of SiC$\underline{H_3}$ SiC$\underline{H_2}$ and $\overline{SiCH_3N\underline{H}}$).

Molecular weight (cryscopic in benzene): 2360 g/mol TGA (25°–1000° C., 10° C./min): 88% yield of a black ceramic solid $T_{1/2}=670°$ C.

Melting point (sealed capillary under vacuum): Does not melt at temperatures up to 320° C.

Analysis: Found: C, 31.88; H, 7.52; Si, 49.16; N, 11.69; Total: 100.25%.

Ceramic Analysis: Large scale pyrolysis of the sample under argon gave an 80% yield of a black ceramic solid (25°–1000° C., 10° C./min). Found: C, 24.03; H, 0.77; Si, 60.72; N, 14.72; Total: 100.24%. Composition: $1SiC+0.2Si_3N_4+0.45$ C. (equivalent to 7.5 weight % of free carbon)

b. Polycarbosilane/$[CH_3SiHNH]_m$ in 5:1 Weight Ratio (III-59).

According to the procedure described previously, the reactions between 0.005 g (1.25 mmol) KH and 1.0 g (0.017 mol) ($CH_3SiHNH)_m$ (prepared in THF solution) in 100 ml of THF were carried out under nitrogen. The living polymer solution then was added to the THF (50 ml) solution of polycarbosilane (5.0 g). The resulting solution was stirred at room temperature overnight. To the reaction mixture 0.5 ml (7.9 mmol) of $CH_3I$ was added and the mixture was refluxed for 2 hours. Work-up as described in the previous experiment left 5.9 g (98% yield by weight) of a white solid. The polymer is very soluble in hexane, benzene, and THF.

$^1$H NMR (90 MHz, $C_6D_6$): δ5.07, 4.55 (broad, Si$\underline{H}$, 1H) 1.24, 0.89 (SiC$\underline{H_3}$N$\underline{H}$) 0.28 (broad, SiC$\underline{H_3}$, SiC$\underline{H_2}$ 7.5H, for the total area of SiC$\underline{H_3}$ SiC$\underline{H_2}$ and $\overline{SiCH_3NH}$).

Molecular weight (cryoscopic in benzene): 970 g/mol. TGA (25°–1000° C., 10° C./min): 64% yield of a black ceramic solid $T_{1/2}=530°$ C.

Melting point (sealed capillary under vacuum): Softens at 240° C., melts at 265° C., no further change up to 300° C.

Reactions of a Mixture of Cyclic $[CH_3SiHNH]_3$ and Polycarbosilane with KH Catalyst ("In-Situ Procedure").

1. Using Cyclo-$[CH_3SiHNH]_m$ Prepared from Diethyl Ether.

a. Polycarboxilane/$[CH_3SiHNH]_m$ in 1:1 weight ratio (III-38).

In a dry box, a 250 ml round-bottomed flask equipped with a stir-bar, reflux condenser and a serum cap was charged with 0.15 g of KH (3.75 mmol). THF (50 ml) was added to suspend the KH. A separate 250 ml Schlenk flask was charged wtih 5.0 g of ($CH_3SiHNH)_m$ (0.085 mol), prepared in ether solution, and 5.0 g of polycarbosilane, and 150 ml of THF. The mixed polymer solution was transferred by cannula into the KH suspension in THF. The reaction mixture gradually turned clear and hydrogen gas slowly evolved. The resulting solution was stirred at room temperature for 2 hours and then heated at reflux for 24 hours. The reaction mixture was allowed to cool to room temperature and 0.5 ml (7.9 mmol) of $CH_3I$ was added and the mixture was heated for several hours. The solvent was removed by trap-to-trap distillation. The product was extracted with 200 ml1 of hexane and the insoluble residue removed by centrifugation. The clear, colorless supernatant layer was transferred via a cannula into a weighed 250 ml round-bottomed flask. The hexane was removed by trap-to-trap distillation leaving 9.7 g (97% yield by weight) of a white powder. The white powder is soluble in THF, benzene, and hexane.

$^1$H NMR (90 MHZ,$C_6D_6$) δ5.10, 4.55 (broad 5:$\underline{H}$, 1H) 1.56, 1.22, 0.88 (SiC$\underline{H_3}$N$\underline{H}$) 0.26, 0.19, (broad $\overline{SiCH_3}$, and SiC$\underline{H_2}$ 9.1H, for total area of SiC$\underline{H_2}$ and SiC$\underline{H_3}$N$\underline{\overline{H}}$)

Molecular weight (cryoscopic in benzene): 2150 g/mol TGA (25°–1000° C., 10° C./min): 86% yield of a black ceramic solid $T_{1/2}=670°$ C.

Melting point (sealed capillary under vacuum): Does not melt at temperatures up to 320° C.

Analysis: Found: C, 31.87; H, 7.55; Si, 48.93; N, 11.70; Total: 100.05%.

Ceramic Analysis: Large scale pyrolysis of the sample under $N_2$ to give 74% yield of a black ceramic solid (25°–1000° C., 10° C./min) Found: C, 24.79; H, 0.70; Si; 56.79; N, 15.80; Total: 97.38%. Composition: $1SiC+0.2Si_3N_4+0.6$ C. (equivalent to 9.6 weight % of free carbon)

b. Polycarbosilane/$[CH_3SiHNH]_m$ in 5:1 weight ratio (III-56).

According to the procedure described previously, the reactions between 0.05 g of KH (1.25 mmol), 1.0 g of $[CH_3SiHNH]_m$ (prepared in ether solution), and 5.0 g of polycarbosilane was carried out under nitrogen. The resulting reaction mixture also gradually turned clear with slow evolution of hydrogen gas. The solution was stirred at room temperature for 3 hours and then heated at reflux for 2 hours. The solution was allowed to cool to room temperature and 0.5 ml (7.9 mmol) of $CH_3I$ was added and the mixture refluxed for several hours.

Work-up as described in the previous experiment left a white solid (5.8 g, 97% yield by weight). The white powder is soluble in THF, benzene and hexane.

$^1$H NMR (90 MHz, C$_6$D$_6$): δ5.03, 4.54 (broad, SiH, 1H) 1.23, 0.88 (SiCH$_3$NH) 0.24 (broad, SiCH$_3$, and SiCH$_2$, 8.3H, for the total area of SiCH$_3$, SiCH$_2$ and SiCH$_3$NH).

Molecular weight (cryoscopic in benzene): 1670 g/mol. TGA (25°–1000° C., 10° C./min): 80% yield of a black ceramic solid T$_{1/2}$=610° C.

Melting point (sealed capillary under vacuum): Soften at 235° C., melts at 260° C., no further change up to 275° C.

2. Using Cyclo-[CH$_3$SiHNH]$_m$ Prepared from THF.

a. Polycarbosilane/[CH$_3$SiHNH]$_m$ in 1:1 weight ratio (III-40).

Figure 4:
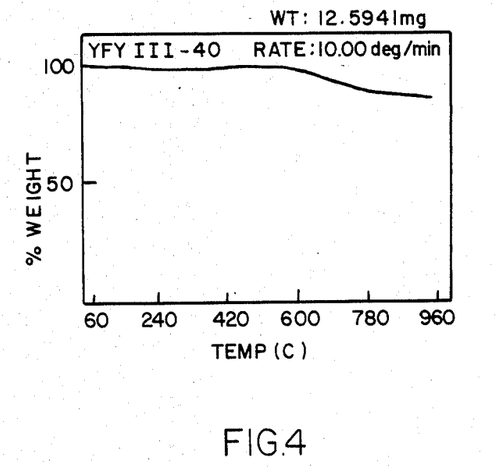
FIG. 4 is a TGA curve of a polymer formed with polysilylamide generated in situ (III-40).

In a dry box, a 250 ml round-bottomed flask equipped with a stir-bar, reflux condenser and a serum cap was charged with 0.15 g of KH (3.75 mmol). THF (50 ml) was added to suspend the KH. A separate 250 ml Schlenk flask was charged with 5.0 g of [CH$_3$SiHNH]$_m$ (0.085 mol), prepared in THF solution, and 5.0 g of polycarbosilane, and 150 ml of THF. The mixed polymer solution was transferred by cannula into the KH suspension. The reaction mixture gradually turned clear and hydrogen gas slowly evolved. The resulting solution was stirred at room temperature for 24 hours and then 0.5 ml (7.9 mmol) of CH$_3$I was added and the mixture was refluxed for 2 hours. The solvent was removed by trap-to-trap distillation. The product was extracted with 200 ml of hexane and the insoluble residue removed by centrifugation. The clear, colorless supernatant layer was transferred via a cannula into a weighed 250 ml round-bottomed flask. The hexane was removed by trap-to-trap distillation leaving 9.8 g (98% yield by weight) of a white powder. The white powder is soluble in THF, benzene, and hexane. The TGA curve of the mixed polymer is shown in FIG. 4.

$^1$H NMR (90 MHz, C$_6$D$_6$): δ5.21, 4.57 (broad, SiH, 1H) 1.25 (broad, SiCH$_3$NH) 0.34, 0.30 (broad, SiCH$_3$, and SiCH$_2$, 8.8H, for the total area of SiCH$_3$, SiCH$_2$ and SiCH$_3$NH).

Molecular weight (cryoscopic in benzene): 2560 g/mol. TGA (25°–1000° C., 10° C./min): 86% yield of a black ceramic solid T$_{1/2}$=670° C.

Melting point (sealed capillary under vacuum). Does not melt at temperature up to 320° C.

Analysis: Found: C, 31.04; H, 7.36; Si, 50.16; N, 11.62; Total: 100.18%.

Ceramic Analysis: Large scale pyrolysis of the sample under argon gave a 78% yield of a black ceramic solid (25°–1000° C., 10° C./min). Found: C, 23.36; H, 0.85; Si, 59.95; N, 15.94; Total: 100.10%. Composition: 1SiC+0.2Si$_3$N$_4$+0.5 C. (equivalent to 7.9 weight % of free carbon)

b. Polycarbosilane/[CH$_3$SIHNH]$_3$ in 5:1 weight ratio (III-58).

According to the procedure described previously, the reaction between 0.05 g of KH (1.25 mmol), 1.0 g of [CH$_3$SiHNH]$_m$ (prepared in THF solution), and 5.0 g of polycarbosilane was carried out under nitrogen. The resulting reaction mixture also gradually turned clear with slow evolution of hydrogen gas. The solution was stirred at room temperature for 14 hours and 0.5 ml (7.9 mmol) of CH$_3$I was added and the mixture was refluxed for 2 hours. Work-up as described in the previous experiment left a white solid (5.9 g, 98% yield by weight). The white powder is soluble in THF, benzene, and hexane.

$^1$H NMR (90 MHz, C$_6$D$_6$): δ5.07, 4.55 (broad, SiH, 1H) 1.24, 0.88 (SiCH$_3$NH) 0.28 (broad, SiCH$_3$, and SiCH$_2$, 8.1H, for the total area of SiCH$_3$, SiCH$_2$ and SiCH$_3$NH).

Molecular weight (cryoscopic in benzene): 1100 g/mol TGA (25°–1000° C., 10° C./min): 66% yield of a black ceramic solid T$_{1/2}$=530° C.

Melting point (sealed capillary under vacuum): Softens at 240° C., melts at 260° C., no further change up to 275° C.

J. Reaction of the Polycarbosilane with Partially Deprotonated Polymerization Product of Cyclo-[(CH$_3$)$_2$SiNH]$_m$.

a. Polymerization of Cyclo-[(CH$_3$)$_2$SiNH]$_m$.

A 100 ml, three necked, round-bottomed flask equipped with a stir-bar, a thermometer, and two gas inlet tubes was charged with 45.0 ml (41.4 g, 0.188 mol) of [(CH$_3$)$_2$SiNH]$_3$ and 2.07 g (0.052 mol, 5% by weight) of NH$_4$Br. After flushing the system with nitrogen, a constant stream of nitrogen was maintained. The reaction mixture was then heated at 160 C. for 8 hours during which time NH$_3$ gas slowly evolved. The reaction mixture was allowed to cool to room temperature, and then dissolved in 300 ml of diethyl ether. The solution was cannulated into a 500 ml, three-necked, round-bottomed flask equipped with a cold condenser (dry ice-acetone) and two no-air rubber serum caps. The solution was cooled to 0° C. An excess of anhydrous ammonia was bubbled into the reaction mixture during about 1 hour. The reaction mixture was filtered with a Schlenk fritted filter. The solvent was removed by trap-to-trap distillation to leave a viscous oil. The latter was then distilled under reduced pressure (0.05 mmHg) and the low boiling compounds (starting material and oligomers) were collected from 100° C. to 250° C. A very viscous gum remained (20.2 g, 49% by weight).

$^1$H NMR (90 MHz, C$_6$D$_6$): δ0.42 (broad, SiCH$_3$b, 1H) 0.23 (broad, SiCH$_3$, 1.2H)

Molecular weight (cryoscopic in benzene): 5100 g/mol. TGA (25°–1000° C., 10° C./min): 100% weight loss occurred at 630° C.

b. Reaction of the Polycarbosilane with the Product of Section J.(a).

In a dry box, a 100 ml round bottomed flask equipped with a stir-bar, reflux condenser and a serum cap was charged with 0.1 g (2.25 mmol) of KH (5% by weight). THF (10 ml) was added to suspend the KH. A solution of the polymer prepared in Section (a) above (2.0 g in 30 ml of THF) was added into the flask by cannulation. After the addition was finished, the reaction mixture was heated at reflux temperature for 2 hours. The solution gradually turned clear while H$_2$ gas slowly evolved, forming the polysilylamide.

A separate 100 ml round-bottomed flask equipped with a septum, reflux condenser and stir-bar was charged with 2.0 g of polycarbosilane. THF (30 ml) was added by syringe to give a clear solution. The polysilylamide solution was cannulated slowly into the reaction flask. The reaction mixture was then heated at reflux for 4 hours. The resulting yellow solution was treated with 0.5 ml (7.9 mmol) of CH$_3$I, the mixture was refluxed for 2 hours and the solvent was removed by trap-to-trap distillation. The product was extracted with 80 ml of hexane and the insoluble residue removed by centrifugation. The hexane was removed from the supernatant solution by trap-to-trap distillation, leaving 3.7 g (93% yield by weight) of a white solid. The polymer is very soluble in hexane, benzene, and THF.

$^1$H NMR (90 MHz, C$_6$D$_6$): δ4.60 (broad, SiH, 1H) 0.43, 0.33, 0.23, 0.16, 0.13, 0.11 (multiplet, SiCH$_3$, SiCH$_2$, and NH, 13.8H, for the total area of SiCH$_3$, SiCH$_2$, and NH).

Molecular weight (cryoscopic in benzene): 1570 g/mol. Pyrolysis (to 1000° C.) gave a black ceramic material.

K. Reactions of [(CH$_3$SiHNH)$_a$(CH$_3$SiN)$_b$(CH$_3$SiHNK)$_c$]$_m$ Living Polymer with Polycarbosilane [(CH$_3$SiH)$_x$(CH$_3$Si)$_y$]$_n$ Organopolysilane mixtures.

1. Polycarbosilanbe/Organopolysilane/Polymeric Silylamide in 1:1:2 Weight Ratio.

a. Polycarbosilane/Polysilane Mixture Added to the Polymeric Silylamide Solution.

A 250 ml round-bottomed flask equipped with a stirbar, reflux condensor and a serum cap was charged with 0.13 g (3.25 mmol) of KH (4.3 mol %, based on (CH$_3$SiHNH) unit). THF (50 ml) was added to suspend the KH. Then 5.15 g (0.088 mol of CH$_3$SiHNH unit) of (CH$_3$SiHNH)$_m$ oligomer (via ammonolysis of CH$_3$SiHCl$_2$ Tn the THF) in 75 ml of THF was added. A vigorous reaction occurred with brisk evolution of H$_2$. After the addition was completed, the reaction mixture was stirred at room temperature for 2 hours.

A separate 250 ml flask equipped as above was charged with 2.58 g of the polycarbosilane and 2.58 g of [(CH$_3$SiH)$_x$(CH$_3$Si)$_y$]$_n$ (liquid polysilane, prepared by sodium condensation of CH$_3$SiHCl$_2$ in 7:1 hexane/THF) and 50 ml of THF. To the resulting clear solution was added very slowly by cannula the polymeric silylamide solution prepared above. The resulting clear orange solution was stirred at room temperature for 2 hours and then at reflux for 24 hours. Subsequently, 0.5 ml of CH$_3$I was added, the mixture was refluxed for 2 hours and then the solvent was removed at reduced pressure. To the residue was added 150 ml of hexane to extract the product. Centrifugation removed insoluble salts. The hexane extracts were evaporated at reduced pressure, leaving 9.12 g (89% yield, by weight) of a white solid which was found to be soluble in hexane, benzene and THF.

$^1$H NMR (90 MHz, CDCl$_3$): δ5.18, 4.67 (broad, SiH, 1H) 1.39, 1.22 (SiCH$_3$NH) 0.48, 0.27 (broad, SiCH$_3$ and SiCH$_2$, 6.2H for total SiCH$_3$, SiCH$_2$ and SiCH$_3$NH)

Molecular weight (cryoscopic in benzene): 1730 g/mol TGA (25°–1000° C., 10° C./min): 86% yield of a black ceramic solid, T$_{1/2}$=630° C.

Melting point (sealed capillary under vacuum): does not melt up to 300° C.

Ceramic analysis: Large scale pyrolysis of the sample under argon (25°–1000° C., 10° C./min): 77% yield of a black ceramic solid.

b. Alternate Mode of Addition

A solution of [CH$_3$SiHNH)$_a$(CH$_3$SiN)$_b$(CH$_3$SiHNK)$_c$]$_m$ (prepared by reaction of 0.12 9 (3.0 mmol) of KH and 5.27 g (0.090 mol) of (CH$_3$SiHNH) unit) of the CH$_3$SiHCl$_2$ ammonolysis product (prepared in THF) in 50 ml of THF was cannulated into a 250 ml flask containing 2.63 g of [(CH$_3$SiH)$_x$(CH$_3$Si)$_y$]$_n$ polysilane in 50 ml of THF. The resulting clear orange solution was stirred under nitrogen at room temperature for one hour. To this solution then was added 2.63 g of the polycarbosilane in 50 ml of THF. This reaction mixture was stirred at room temperature for 2 hours and at reflux for 24 hours. After addition of 0.5 ml of CH$_3$I, the further procedure followed as described in K.1.(a). The product polymer was a white, soluble solid (9.14 g, 87% yield).

$^1$H NMR (C$_6$D$_6$): δ5.19, 4.72 (broad, SiH, 1H) 1.39, 0.98 (SiCH$_3$NH) 0.27 (broad, SiCH$_3$ and SiCH$_2$, 5.4H for the total SiCH$_3$, SiCH$_2$ and SiCH$_3$NH)

Molecular weight: 1790 g/mol TGA (25°–1000° C., 10° C./min): 85% yield of a black ceramic solid.

2. Same Components as in K.1. in 1:1:1 Weioht Ratio

A solution of the polymeric silylamide was prepared as described above (3.20 g of CH$_3$SiHCl$_2$ ammonolysis product, 0.1 g of KH in 100 ml of THF). This solution was added, under nitrogen with stirring, to a mixture of 3.02 g of the polycarbosilane and 3.08 g of the liquid [(CH$_3$SiH)$_x$(CH$_3$Si)$_y$]$_n$ polysilane in 50 ml of THF. The further procedure followed that described in K.1.(a). The product polymer was isolated as a soluble white solid (8.40 g, 90% yield).

$^1$H NMR (C$_6$D$_6$): δ5.20, 4.81 (broad, SiH, 1H) 1.40 (SiCH$_3$NH) 0.47, 0.27 (broad, SiCH$_3$ and SiCH$_2$, 6.3H for total SiCH$_3$ SiCH$_2$ and SiCH$_3$NH)

Molecular weight: 970 g/mol TGA (25°–1000° C., 10° C./min): 84% yield of a black ceramic solid.

Melting point (sealed, evacuated capillary): softens at 310° C., melts 340°–350° C.

Analysis found: C, 32.64; H, 7.83; N, 9.07; Si, 48.82.

Ceramic analysis: Large scale pyrolysis of sample under argon (25°–1000° C.): black ceramic in 72% yield.

Analysis found: C, 26.15; N, 12.37; Si, 61.48. Composition: 1SiC+0.14Si$_3$N$_4$+0.43 C.

3. Same Components as in K.1. in 1:2:1 Weight Ratio

A solution of the polymeric silylamide was prepared as described in K.1.(a) (3.0 g of CH$_3$SiHCl$_2$ ammonolysis product, 0.1 g of KH in 100 ml of THF). This solution was cannulated, slowly with stirring under nitrogen, to a mixture of 3.0 g of the polycarbosilane and 6.0 g of the [(CH$_3$SiH)$_x$(CH$_3$Si)$_y$]$_n$ liquid polysilane in 50 ml of THF. The further procedure followed that described in K.1.(a). The white, solid product polymer was obtained in 92% yield (11.1 g). It was found to be very soluble in hexane, benzene and THF.

$^1$H NMR (C$_6$D$_6$): δ5.12, 4.79, 4.19 (broad, SiH, 1H) 1.40 (SiCH$_3$NH) 0.30, 0.25 (broad, SiCH$_3$ and SiCH$_2$, 3.9H for total SiCH$_3$ SiCH$_2$ and SiCH$_3$NH)

Molecular weight: 615 g/mol TGA (25°–1000° C., 10° C./min): 74% yield of a black solid.

Melting point: (sealed evacuated capillary): softens at 230° C., melts at 260°–270° C.

Ceramic analysis: Large scale pyrolysis of sample under argon (25°–1000° C.); 74% yield of a black ceramic.

Analysis found: C, 26.60; N, 8.23; Si, 65.17. Composition: 1SiC+0.08Si$_3$N$_4$ +0.18 C.

L. Experiments with Physical Polymer Blends of Polycarbosilane and [(CH$_3$SiHNH)$_a$(CH$_3$SiN)$_b$(CH$_3$SiHNCH$_3$)$_c$]$_m$.

1. Using [(CH$_3$SiHNH)$_a$(CH$_3$SiN)$_b$(CH$_3$SiHNCH$_3$)$_c$]$_m$ Prepared in Ether Solution (IV-20).

a. At Room Temperature.

In a dry box, 1.0 g of polycarbosilane and 1.0 g of [(CH$_3$SiHNH)$_a$(CH$_3$SiN)$_b$(CH$_3$SiHNCH$_3$)$_c$]$_m$ were finely ground together. The TGA curve of the physical blend polymer was measured.

TGA (25°–1000° C., 10° C./min): 76% of a black ceramic solid.

The solid polymer blend was then dissolved in hexane. The solvent was slowly removed by trap-to-trap distillation to give a homogeneous mixture. The TGA curve of the mixture was again measured.

TGA (25°–1000° C., 10° C./min): 78% of a black ceramic solid.

b. At Refluxing Toluene Temperature.

Figure 5:
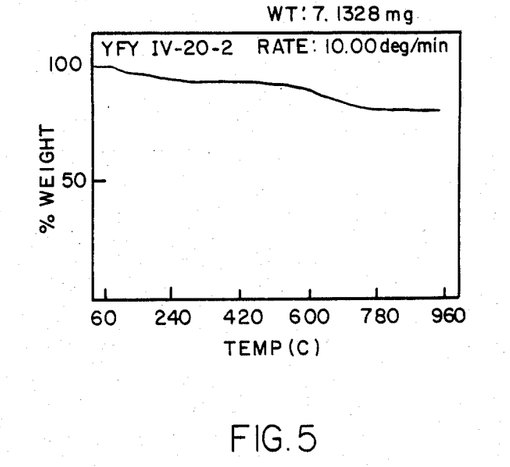
FIG. 5 is a TGA curve of a physical mixture of polycarbosilane and polysilylamide (IV-20-2).

The mixed polymer prepared as in the previous experiment was dissolved in 10 ml of toluene and added to a 50 ml three-necked, round-bottomed flask. The solution was heated at reflux for 3 hours and the solution remained clear. Solvent was removed by trap-to-trap distillation to give a white powder which is soluble in THF, benzene, and hexane. The TGA curve of the polymer is shown in FIG. 5.

TGA (25°–1000° C., 10° C./min): 79% of a black ceramic solid.

c. A Blend Heated Neat at 200° C.

The polymer prepared as in the previous experiment was transferred to a 50 ml round-bottomed flask and was then heated in a sand bath at 200° C. for 2 hours. The finely ground powder turned to a foamy solid at the end of heating. The heat-treated mixed polymer is insoluble in THF, benzene, and hexane.

TGA (25°–1000° C., 20° C./min): 82% of a black ceramic solid.

Using the same general procedure as outlined above, the polymer blends between polycarbosilane with different quantities of $[(CH_3SiHNH)_a(CH_3SiN)_b(CH_3SiHNCH_3)_c]_m$ (ether preparation) were prepared. The ceramic yields of these polymer blends produced are tabulated in Table 2.

TGA (25°–1000° C., 10° C./min): 76% of a black ceramic solid.

c. A Blend Heated Neat at 200° C.

The polymer blend prepared as in the previous experiment was transferred to a 100 ml round-bottomed flask and was then heated in a sand bath at 200° C. for 2 hours. The heat-treated mixed polymer is insoluble in THF, benzene, and hexane.

TGA (25°–1000° C., 10° C./min): 86% of a black ceramic solid.

Using the same general procedure as outlined above, the polymer blends between polycarbosilane with different quantities of $[(CH_3SiHNH)_a(CH_3SiN)_b(CH_3SiHNCH_3)_c]_m$ (THF preparation) were prepared. The ceramic yield of these polymer blends produced are tabulated in Table 2.

3. Ternary Blends a. Mixed at Room Temperature

In a dry box, 2.0 g of the polycarbosilane, 2.0 g of the liquid $[(CH_3SiH)_x(CH_3Si)_y]_n$ organopolysilane and 4.0 g of the $[(CH_3SiHNH)_a(CH_3SiN)_b(CH_3SiHNCH_3)_c]_m$ polysilazane (prepared in THF solution) were combined to give a nonhomogeneous mixture which was dissolved in 40 ml of hexane. This solution was stirred at room temperature for one hour and then was evaporated at reduced pressure. A homogeneous white powder remained. This material was finely ground under nitrogen and examined by thermal analysis.

TGA (25°–1000° C., 10° C./min): 77% yield of a black ceramic.

b. At Refluxing Toluene Temperature

The polymer mixture prepared in L.3.(a) was dis-

TABLE 2

TGA Ceramic Yield of Polymer Blends.

| Sample | Average (%)* | Solid Mixture (%) | Hexane Solution (%) | Reflux in Toluene (%) | Heated Neat at 200° C. (%) |
|---|---|---|---|---|---|
| A | 71 | 76 | 78 | 79 | 82 |
| B | 65 | 70 | 70 | 71 | — |
| C | 70 | 77 | 80 | 76 | 86 |
| D | 65 | 70 | 71 | 71 | — |

A: Polycarbosilane and $[(CH_3SiHNH)_a(CH_3SiN)_b(CH_3SiHNCH_3)_c]_m$ (ether preparation) in 1:1 weight ratio.
B: Polycarbosilane and $[(CH_3SiHNH)_a(CH_3SiN)_b(CH_3SiHNCH_3)_c]_m$ (ether preparation) in 3:1 weight ratio.
C: Polycarbosilane and $[(CH_3SiHNH)_a(CH_3SiN)_b(CH_3SiHNCH_3)_c]_m$ (THF preparation) in 1:1 weight ratio.
D: Polycarbosilane and $[(CH_3SiHNH)_a(CH_3SiN)_b(CH_3SiHNCH_3)_c]_m$ (THF preparation) in 3:1 weight ratio.
*Average of the ceramic yields obtained with the separate components.

2. Using $[CH_3SiHNH)_a(CH_3SiN)_b(CH_3SiHNCH_3)_c]_m$ Prepared in the THF Solution (IV-22).

a. At Room Temperature.

In a dry box, 1.0 g of polycarbosilane and 1.0 g of $[(CH_3SiHNH)_a(CH_3SiN)_b(CH_3SiHNCH_3)_c]_m$ were finely ground together. The TGA curve of the physical blend polymer was measured.

TGA (25°–1000° C., 10° C./min): 77% of a black ceramic solid.

The solid polymer blend then was dissolved in hexane. The solvent was slowly removed by trap-to-trap distillation to give a homogeneous mixture. The TGA curve of the mixture was again measured.

TGA (25°–1000° C., 10° C./min): 80% of a black ceramic solid.

b. At Refluxing Toluene Temperature.

The mixed polymer prepared as in the previous experiment was dissolved in 10 ml of toluene and added to a 50 ml three-necked, round-bottomed flask. The solution was heated at reflux for 3 hours and the solution remained clear. Solvent was removed by trap-to-trap distillation to give a white powder which is soluble in THF, benzene, and hexane.

solved in 40 ml of toluene in a 100 ml flask equipped with a reflux condenser and a nitrogen inlet tube. The solution was heated at reflux under nitrogen for 3 hours. Subsequent removal of solvent at reduced pressure left a white powder which was soluble in hexane, benzene and THF. The powder was finely ground and examined by thermal analysis.

TGA (25°–1000° C., 10° C./min): 76% yield of a black ceramic.

c. Neat at 200°

In a dry box 4 g of the polymer blend prepared in L.3.(a) was charged into a 250 ml flask equipped with a reflux condenser and a nitrogen inlet tube. The flask was heated in a sand bath at 200° C. for 2 hours. The resulting hard, solid product now was insoluble in hexane, benzene and THF. It was finely ground and examined by thermal analysis.

TGA (25°–1000° C., 10° C./min): 85% yield of a black ceramic.

M. Ceramic Preparation

1. Preparation of Ceramic Fibers.
   a. From Mixed Polymer Prepared as in B.1.(a).

In a dry box, approximately 1 g of sample III-37 was dissolved in toluene (ca. 10 ml). The solution was concentrated under vacuum until a fibrous, gummy material was obtained. Fibers approximately 1 ft. long were pulled with a glass rod dipped into the gummy solid. The fibers were quickly placed in a fused silica crucible which was in turn placed in a quartz tube furnace and flushed with argon. The polymer fibers then were converted into ceramics by pyrolyzing them at 10° C./min to 1000° C. This produced black ceramic fibers. SEM micrographs of the ceramic fibers were obtained.

b. From Mixed Polymer Prepared as in C.1.(a).

In a dry box, approximately 1 g of sample III-39 was dissolved in toluene (ca. 10 ml). The solution was concentrated under vacuum until a fibrous, gummy material was obtained. Fibers approximately 1 ft. long were pulled with a glass rod dipped into the gummy solid. The fibers were quickly placed in a fused silica crucible which was in turn placed in a quartz tube furnace and flushed with argon. The polymer fibers then were converted into ceramics by pyrolyzing them at 10° C./min to 1000° C.

This produced black ceramic fibers. SEM micrographs of the ceramic fibers were obtained.

c. From Mixed Polymer Prepared as in B.1.(a).

In a dry box, approximately 1 g of sample III-40 was dissolved in toluene (ca. 10 ml). The solution was concentrated under vacuum until a fibrous, gummy material was obtained. Fibers approximately 1 ft. long were pulled with a glass rod dipped into the gummy solid. The fibers were quickly placed in a fused silica crucible which was in turn placed in a quartz tube furnace and flushed with argon. The polymer fibers then were converted into ceramics by pyrolyzing them at 10° C./min to 1000° C. This produced black ceramic fibers. SEM micrographs of the ceramic fibers were obtained.

2. Preparation of Ceramic Bars.

a. From Mixed Polymer Prepared as in B.1.(a).

The polymer (III- 37, 2.28 g) was loaded into a 3.9 cm × 1.3 cm × 3.7 cm rectangular steel die and uniaxially pressed at 5000 lbs. for 5 minutes. The polymer bar was then bagged and isostatically pressed at 40,000 psi for one minute. The sample was placed in the quartz tube furnace and pyrolyzed under argon to 1000° C., heating at 10° C./min. A black, rectangular shaped bar was obtained with a loss of 32% of the original weight. SEM micrographs of the ceramic bar was obtained.

b. From Mixed Polymer Prepared as in B.2.(a).

The polymer (III-38, 2.57 g) was loaded into a 3.9 cm × 1.3 cm × 3.7 cm rectangular steel die and uniaxially pressed at 5000 lbs. for 5 minutes. The polymer bar was then bagged and isostatically pressed at 40,000 psi for one minute. The sample was placed in the quartz tube furnace and pyrolyzed under argon to 1000° C., heating at 10° C./min. A black, rectangular shaped bar was obtained with a loss of 29% of the original weight. SEM micrographs of the ceramic bar was obtained.

c. From Mixed Polymer Prepared as in C.1 (a).

The polymer (III-39, 2.36 g) was loaded into a 3.9 cm × 1.3 cm × 3.7 cm rectangular steel die and uniaxially pressed at 5000 lbs for 5 minutes. The polymer bar was then bagged and isostatically pressed at 40,000 psi for one minute. The sample was placed in the quartz tube furnace and pyrolyzed under argon to 1000° C., heating at 10° C./min. A black, rectangular shaped bar was obtained with a loss of 27% of the original weight. SEM micrographs of the ceramic bar was obtained.

d. From Mixed Polymer Prepared as in C.2.(a).

The polymer (III-40, 2.07 g) was loaded into a 3.9 cm × 1.3 cm × 3.7 cm rectangular steel die and uniaxially pressed at 5000 lbs. for 5 minutes. The polymer bar was then bagged and isostatically pressed at 40,000 psi for one minute. The sample was placed in the quartz tube furnace and pyrolyzed under argon to 1000° C., heating at 10° C./min. A black, rectangular shaped bar was obtained with a loss of 24% of the original weight. SEM micrographs of the ceramic bar was obtained.

This invention has been described in detail including the preferred embodiments thereof. However, it will be appreciated that those skilled in the art, upon consideration of this disclosure, may make modifications and improvements without departing from the spirit and scope of the invention as set forth in the claims.

We claim:

1. A method for preparing novel preceramic organosilicon polymers, wherein the method comprises:
    (a) admixing with a silylamide in an organic solvent a polycarbosilane having at least 25 mole % of repeat units of the formula $RSi(H)-(CH_2)_q$]where R is H, a lower alkyl group having from 1 to about 6 carbon atoms, a cycloalkyl group having 3 to about 6 carbon atoms, or a substituted or unsubstituted lower aryl group having from 6 to about 10 carbon atoms, and q is an integer 1 or greater, wherein the weight ratio of polycarbosilane: silylamide is about 10:1 or less;
    (b) allowing the admixture of step (a) to react at room temperature or above; and
    (c) quenching the reaction mixture with a reactive electrophile, when a metal silylamide is used, thereby forming said organosilicon polymer.

2. The method of claim 1, wherein the metal silylamide has the formula $[(R^1SiHNH)_a(R^1SiN)_b(R^1SiHNM)_c]_m$, where $a+b+C=1$, $R^1$ is a lower alkyl group having from 1 to about 6 carbon atoms, a substituted or unsubstituted alkenyl group having from 2 to about 6 carbon atoms, a substituted or unsubstituted lower aryl group having from 6 to about 10 carbon atoms, a tri(lower)alkyl- or di(lower)alkylsilyl group or a di(lower)alkylamino group; M is an alkali metal or one-half equivalent of an alkaline earth metal; and m is an integer greater than 1.

3. The method of claim 1, wherein R is a lower alkyl group.

4. The method of claim 3, wherein R is $CH_3$.

5. The method of claim 1, wherein q is 3 or less.

6. The method of claim 1, where q is one.

7. The method of claim 2, wherein $R^1$ is a lower alkyl group.

8. The method of claim 7, wherein R is a lower alkyl group.

9. The method of claim 2, wherein $R^1$ is $CH_3$.

10. The method of claim 9, wherein R is $CH_3$.

11. The method of claim 1 wherein the ratio of polycarbosilane to alkali metal silylamide is about 5:1 or less.

12. The method of claim 11 wherein the ratio is about 3:1 or less.

13. The method of claim 11 wherein the ratio is about 1:1.

14. The method of claim 1, wherein the reaction mixture is quenched with an electrophile.

15. The method of claim 14, wherein the electrophile is E-X, where E is selected from the group consisting of organic groups and silyl groups and X is selected from the group consisting of halogen, sulfate and sulfonate.

16. The method of claim 15 wherein the mixture is allowed to react by stirring at room temperature.

17. The method of claim 15 wherein the mixture is heated above room temperature.

18. The method of claim 16 wherein the electrophile quenching the reaction is an organic halide or a halosilane.

19. The method of claim 18 wherein the organic halide is a lower alkyl halide.

20. The method of claim 19 wherein the lower alkyl halide is $CH_3I$.

21. The method of claim 18 wherein the halosilane is a chlorosilane.

22. A preceramic polymer containing Si, C and N formed by the method of claim 1.

23. A preceramic polymer containing Si, C and N formed by the method of claim 2.

24. A preceramic polymer containing Si, C and N formed by the method of claim 4.

25. The method of claim 1 wherein the silylamide is $[R^2R^3R^4Si]_2NM$ wherein $R^2$, $R^3$ and $R^4$ are each a lower alkyl group having from 1 to about 6 carbon atoms, a lower alkoxy group having from 1 to about 6 carbon atoms, a substituted or unsubstituted vinyl group, a substituted or unsubstituted lower aryl group having from 6 to about 10 carbon atoms, a tri(lower)alkyl- or di(lower)alkylsilyl group or a di(lower)alkylamino group, $R^2$, $R^3$ and $R^4$ may be the same or different; and M is an alkali metal or one-half equivalent of an alkaline earth metal.

26. The method of claim 25 wherein $[R^2R^3R^4Si]_2NM$ is selected from $[(CH_3)_2(CH_2=CH)Si]_2NM$ and $[(CH_3)_3Si]_2NM$.

27. The method of claim 1 wherein the silylamide is partially deprotonated cyclo-$[R^5R^6SiNH]_m$ containing $[R^5R^6SiNM]$ units wherein $R^5$ and $R^6$ are each a lower alkyl group having from 1 to about 6 carbon atoms, a lower alkoxy group having from 1 to about 6 carbon atoms, a substituted or unsubstituted vinyl group, a substituted or unsubstituted lower aryl group having from 6 to about 10 carbon atoms, a tri(lower)alkyl- or di(lower)alkylsilyl group or a di(lower)alkylamino group, $R^5$ and $R^6$ may be the same or different; M is an alkali metal or one-half equivalent of an alkaline earth metal and m is an integer greater than 1.

28. The method of claim 27 wherein cyclo-$[R^5R^6SiNH]_m$ is selected form $[(CH_3)_2SiNH]_m$ and $[(CH_3)(CH_2=CH)SiN]_m$.

29. The method of claim 1 wherein R is a lower aryl group.

30. The method of claim 1 wherein the silylamide is derived from a diorganocyclopolysilazane that is either partially or completely ring-opened.

31. The method of claim 30 where the diorganocyclopolysilazane comprises units having the formula $R^1R^{11}SiNH]_m$ where $R^1$ is a lower alkyl group having from 1 to about 6 carbon atoms, a substituted or unsubstituted alkenyl group having from 2 to about 6 carbon atoms, a substituted or unsubstituted lower aryl group having from 6 to about 10 carbon atoms, a tri (lower)alkyl or di(lower)alkylsilyl group or a di(lower) alkylsilyl group or a di(lower)alkylamino group; $R^{11}$ is defined as is $R^1$ and may be the same or different, and m is an integer greater than 1.

32. The method of claim 31 wherein the diorganocyclopolysilazane is reacted with a few mole percent based on available NH groups of a base produce a polymeric silyalamide containing a few mole percent of $[R^1R^{11}SiNM]$ units where M is an alkali metal or one-half equivalent of an alkaline earth metal.

33. The method of claim 31 wherein $R^{11}$ is the same as $R^1$.

34. The method of claim 33 wherein $R^{11}$ and $R^1$ are $CH_3$.1

35. A preceramic polymer formed by the method of claim 10.

36. A preceramic polymer formed by the method of claim 30.

37. A preceramic polymer formed by the method of claim 31.

38. A method for preparing an organosilicox preceramic polymer, wherein the method comprises:
(a) generating a polysilylamide in the presence of a polycarbosilane of the formula: $-[RSi(H)-(CH_2)_9]_n-$, where q is an integer 1 or greater; R is H, a lower alkyl group having from 1 to about 6 carbon atoms, a lower cycloalkyl group having from 3 to about 6 carbon atoms, a substituted or unsubstituted lower aryl group having from 6 to about 10 carbon atoms, and n is an integer greater than 1; wherein the polysilylamide is generated by reacting the ammonolysis product of an $R^1SiHX_2$, where $R^1$ is a lower alkyl group having from 1 to about 6 carbon atoms, a substituted or unsubstituted alkenyl group having from 2 to about 6 carbon atoms, a substituted or unsubstituted lower aryl group having from 6 to about 10 carbon atoms, a tri(lower)alkyl- or di(lower)alkylsilyl group or a di(lower)alkylamino group and X is a halogen, in the presence of a basic catalyst capable of deprotonating the hydrogen from a nitrogen atom adjacent to a silicon atom to generate the polysilylamide in situ;
(b) allowing the in situ generated polysilylamide and the polycarbosilane sufficient time to react with each other at room temperature; and
(c) quenching the mixture with an organic halide or halosilane to produce the organosilicon preceramic polymer.

39. The method of claim 38 wherein the mixture of in situ generated polysilylamide and polycarbosilane reaction mixture is heated in solution above room temperature for a sufficient time to cause a reaction to occur.

40. The method of claim 38 wherein R is a lower alkyl.

41. The method of claim 40, wherein R is $CH_3$.

42. The method of claim 41 wherein $R^1SiHX_2$ is $CH_3SiHCl_2$.

43. The method of claim 38 wherein the organic halide is lower alkyl halides.

44. The method of claim 43 wherein the lower alkyl halide is $CH_3I$.

45. A preceramic polymer formed by the method of claim 38.

46. A preceramic polymer formed by the method of claim 43.

47. A preceramic polymer formed by the method of claim 44.

48. The method of claim 1 wherein an organopolysilane of the formula $(R^aSiH)_x(R^aSi)_y]_n$, where x+y=1, n is an integer greater than 1 , $R^a$ is a lower alkyl group having from about 1 to about 6 carbon atoms, a cycloalkyl group having from 3 to about 6 carbon atoms, a substituted or unsubstituted lower aryl group having from 6 to about 10 carbon atoms or a tri(loewr)alkyl- or di(lower)alkylsilyl group is added to create a ternary preceramic polymer.

49. The method of claim 48 wherein the organopolysilane is added in sufficient quantity so that the excess silicon obtained on pyrolysis of the organopolysilane can react with excess carbon from the pyrolysis of the polycarbosilane and the silylamide, thereby reducing the amount of free carbon.

50. The method of claim 49 wherein $R^a$ is a lower alkyl group.

51. The method of claim 50 wherein $R^a$ is $CH_3$.

52. The method of claim 2 wherein an organopolysilane of the formula $[(R^aSiH)_x(R^aSi)_y]_n$, where $x+y=1$, n is an integer greater than 1, $R^a$ is a lower alkyl group having from about 1 to about 6 carbon atoms, a cycloalkyl group having from 3 to about 6 carbon atoms, a substituted or unsubstituted lower aryl group having from 6 to about 10 carbon atoms or a tri(lower)alkyl- or di(lower)alkylsily group is added to create a ternary preceramic polymer.

53. The method of claim 52 the organopolysilane is added in sufficient quantity so that the excess silicon obtained on pyrolysis of the organopolysilane can react with excess carbon from the pyrolysis of the polycarbosilane and the silylamide, thereby reducing the amount of free carbon.

54. The method of claim 53 wherein $R^a$ is a lower alkyl group.

55. The method of claim 54 wherein $R^a$ is $CH_3$.

56. The method of claim 38 wherein an organopolysilane of the formula $(R^aSiH)_x(R^aSi)_y]_n$, where $x+y=1$, n is an integer greater than 1, $R^a$ is a lower alkyl group having from about 1 to about 6 carbon atoms, a cycloalkyl group having from 3 to about 6 carbon atoms, a substituted or unsubstituted lower aryl group having from 6 to about 10 carbon atoms or a tri(lower)alkyl- or di(lower)alkylsilyl group is added to create a ternary preceramic polymer.

57. The method of claim 56 wherein the organopolysilane is added in sufficient quantity so that the excess silicon obtained on pyrolysis of the organopolysilane can react with excess carbon from the pyroysis of the polycarbosilane and the silylamide, thereby reducing the amount of free carbon.

58. The method of claim 57 wherein $R^a$ is a lower alkyl group.

59. The method of claim 58 wherein $R^a$ is $CH_3$.

60. A preceramic polymer formed by the method of claim 48.

61. A preceramic polymer formed by the method of claim 53.

62. A preceramic polymer formed by the method of claim 55.

63. A preceramic polymer formed by the method of claim 57.

64. A preceramic polymer formed by the method of claim 59.

65. The method of claim 25, wherein the substituted vinyl group is a substituted or unsubstituted allyl group.

66. The method of claim 27, wherein the substituted vinyl group is a substituted or unsubstituted allyl group.

* * * * *